Dec. 10, 1957     G. A. MESANKO     2,815,840
CLAMP FOR COAL LOADING PAN
Filed Oct. 10, 1955
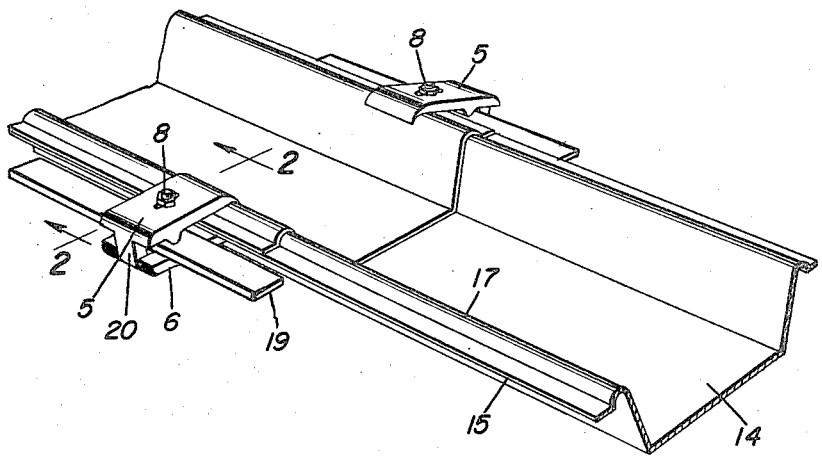
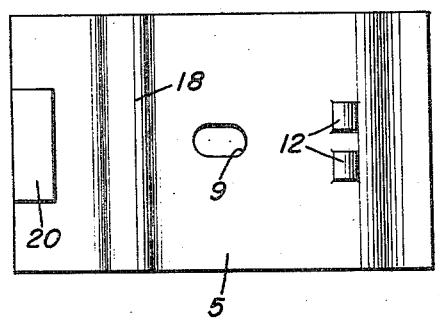
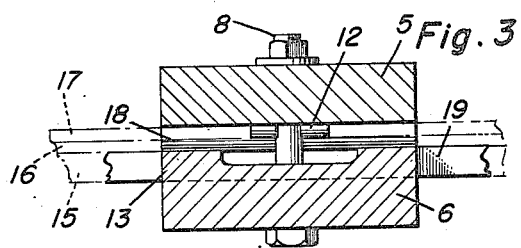
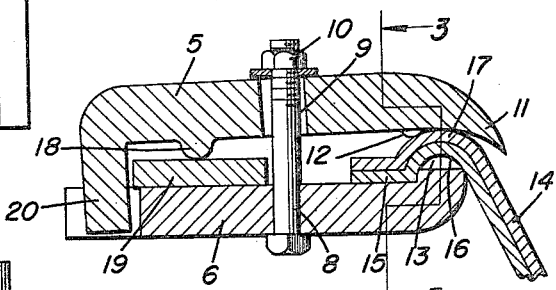
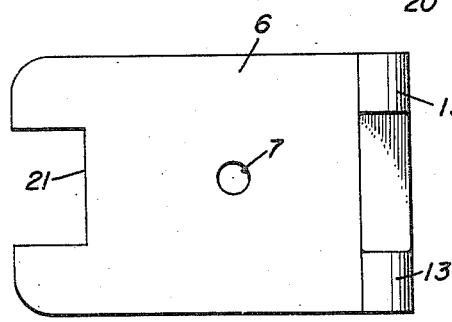
George Anthony Mesanko
INVENTOR.

United States Patent Office 2,815,840
Patented Dec. 10, 1957

2,815,840
CLAMP FOR COAL LOADING PAN

George Anthony Mesanko, De Lancey, Pa., assignor of twenty-five percent to Francis J. Mottey and twenty-five percent to James H. Prothero, both of Punxsutawney, Pa.

Application October 10, 1955, Serial No. 539,456

4 Claims. (Cl. 193—6)

The present invention relates to new and useful improvements in clamps for securing the loading or conveyor pan onto the loading bars of coal loading machinery.

An important object of the invention is to provide a clamp composed of a pair of separable coacting jaws adapted for securing in clamping engagement with a loading pan and a loading bar with a minimum of time and effort to facilitate attaching and removal of the pan on the bars.

Another object of the invention is to provide a clamp of this character having lugs or teeth on the opposing faces of the jaws to effectively clamp the flange at the side edge of the loading pan between the jaws.

Another object is to provide a pair of clamping jaws connected to each other by a bolt and nut at the central portion of the jaws and with the loading pan clamped between one end of the jaws and the loading bar of the coal loading machinery clamped between the other end of the jaws and forming the opposing face of one of the jaws with a transverse rib which rests on the loading bar for rocking movement of the upper clamping jaw in effective clamping engagement with the loading pan.

A still further object is to provide a device of this character of simple and practical construction, which is efficient and reliable in operation, relatively inexpensive to manufacture and otherwise well adapted for the purposes for which the same is intended.

These, together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1 is a perspective view;

Figure 2 is an enlarged vertical sectional view taken on a line 2—2 of Figure 1;

Figure 3 is a transverse sectional view taken on a line 3—3 of Figure 2;

Figure 4 is a plan view of the opposing face of the upper clamping jaw; and

Figure 5 is a similar view of the lower clamping jaw.

Referring now to the drawings in detail wherein, for the purpose of illustration, I have disclosed a preferred embodiment of the invention, the numeral 5 designates an upper clamping jaw or plate, and 6 the lower clamping jaw or plate, and both of substantially rectangular shape. Lower jaw 6 is formed with a central opening 7 to receive a bolt 8, and upper jaw 5 is formed with a central slot 9 to receive the bolt 8 for limited longitudinal movement of the upper jaw relative to the lower jaw. The jaws 5 and 6 are secured to each other in coacting clamping engagement by a nut 10 threaded on the upper end of the bolt 8.

One end portion of the upper jaw 5 is formed with a downwardly curved lip 11 and which will be designated as the inner end of the clamp, and the underside or opposing face of the upper jaw 5 is formed with a pair of transversely aligned, rounded teeth or lugs 12 positioned inwardly with respect to the lip 11. The upper or opposing face of lower jaw 6 is formed at its inner end portion with a transversely extending interrupted rounded rib 13 which is offset slightly inwardly on the clamp with respect to the lugs or teeth 12, as shown more clearly in Figure 2 of the drawing.

The coal loading pan or chute is shown at 14 and includes an outwardly projecting flange 15 at each upper side edge and the underside of the flange is formed with a longitudinal groove 16 while the top of the flange forms a longitudinal beading 17 and the flange of the pan is clamped between the inner end portions of the jaws 5 and 6 by engaging the rib 13 in the groove 16 at the underside of the flange, while the lip 11 at the inner end of upper jaw 5 is curved downwardly at the inner side of beading 17 and the lugs or teeth 12 at the underside of jaw 5 engage the upper portion of the beading 17 in a position outwardly on the flange with respect to rib 13, as shown in Figure 2 of the drawings.

The underside or opposing face of the outer end portion of upper jaw 5 is formed with a transversely extending rounded rib 18 which rockably rests on top of a loading bar 19 of a coal-loading machine and which is positioned outwardly and parallel to each of the flanges 15 of the loading pan 14, and the loading bar 19 is clamped between the outer end portions of the upper and lower jaws 5 and 6 to thus firmly clamp the flanges of the loading pan in a position for supporting the pan on the loading bars.

A substantially rectangular shaped lug 20 extends downwardly at the outer end portion of upper jaw 5 and is engaged in a complementary shaped notch 21 at the outer end portion of lower jaw 6 to prevent twisting or turning of the jaws relative to each other on the bolt 8.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a pair of loading bars having a loading pan supported thereon, said pan including outwardly projecting flanges at its side edges, a pair of coacting clamping jaws including an upper jaw and a lower jaw, tightening means at the central portion of the jaws securing the same to each other, the opposite end portions of the jaws clamping one of the flanges of the pan and one of the bars therebetween, and a protuberance on the underside of the upper jaw in rockable clamping engagement with the bar.

2. In combination, a pair of loading bars having a loading pan supported thereon, said pan including outwardly projecting flanges at its side edges and formed with a longitudinal groove at the underside of each flange and a longitudinal beading on the top of the flange, a pair of coacting clamping jaws including an upper jaw and a lower jaw, tightening means at the central portion of the jaws securing the same to each other and with the bar clamped between the outer end portions of the jaws and with the flange clamped between the inner end portions of the jaws, a protuberance on the underside of the outer end portions of the upper jaw rockably engaging the bar, and protuberances on the opposing faces of the inner end portions of the jaws respectively engaging the groove and beading of the flange.

3. The construction of claim 2 wherein the protuberance which engages the beading is offset with respect to the protuberance which engages the groove to engage one upper side portion of the beading.

4. The construction of claim 2 and including a notch at the outer end of one of the jaws and a vertical tongue at the outer end of the other jaw and engaged in the notch to oppose relative turning movement of the jaws.

References Cited in the file of this patent

UNITED STATES PATENTS

| | | |
|---|---|---|
| 183,988 | Thrift | Oct. 31, 1876 |
| 411,574 | Brion | Sept. 24, 1889 |
| 1,227,258 | Godley | May 22, 1917 |